United States Patent [19]

Lawall

[11] Patent Number: 4,818,152
[45] Date of Patent: Apr. 4, 1989

[54] APPARATUS FOR CONVEYING HOT FINELY DIVIDED MATERIAL

[75] Inventor: Thomas R. Lawall, Emmaus, Pa.
[73] Assignee: Fuller Company, Bethlehem, Pa.
[21] Appl. No.: 918,209
[22] Filed: Oct. 14, 1986
[51] Int. Cl.$^4$ .............................................. B65G 53/20
[52] U.S. Cl. ........................................ 406/88; 406/89; 34/57 C; 432/248; 432/251
[58] Field of Search ...................... 406/86, 87, 88, 89, 406/191, 193, 198; 34/57 C; 432/248, 251

[56] References Cited

U.S. PATENT DOCUMENTS

| | | | |
|---|---|---|---|
| 2,501,487 | 3/1950 | Whitman | 34/57 C |
| 2,866,272 | 12/1958 | Pedersen | 34/57 C |
| 2,882,097 | 4/1959 | Hamren | 406/89 X |
| 3,040,439 | 6/1962 | Frost | 34/57 A |
| 3,708,887 | 1/1973 | Erisman | 34/57 A |
| 4,311,460 | 1/1982 | Lauersdorf et al. | 432/251 X |
| 4,524,702 | 6/1985 | Miller et al. | 432/248 X |

FOREIGN PATENT DOCUMENTS

| | | | |
|---|---|---|---|
| 189005 | 7/1986 | European Pat. Off. . | |
| 765147 | 9/1980 | U.S.S.R. | 406/89 |
| 1055674 | 1/1967 | United Kingdom | 406/89 |

Primary Examiner—Sherman D. Basinger
Assistant Examiner—Paul E. Salmon
Attorney, Agent, or Firm—Frank H. Thomson

[57] ABSTRACT

A fluidizing gravity conveyor for hot particulate material which includes a heat resistant plate having a plurality of holes for receiving bubble caps or nozzles to disperse air flow from a lower plenum chamber to the upper material chamber. The upper material chamber is suitably lined with heat resistant material. Provisions are made for differential thermal expansion.

10 Claims, 1 Drawing Sheet

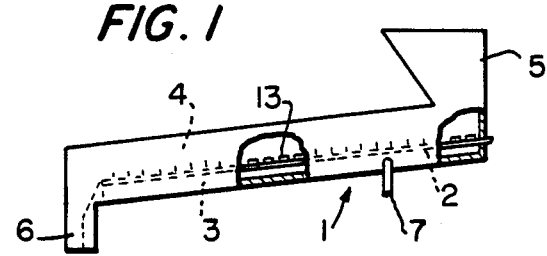
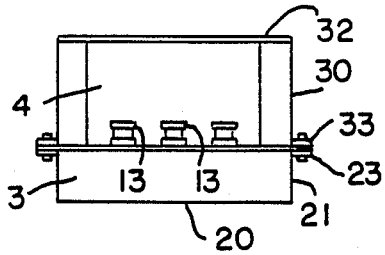
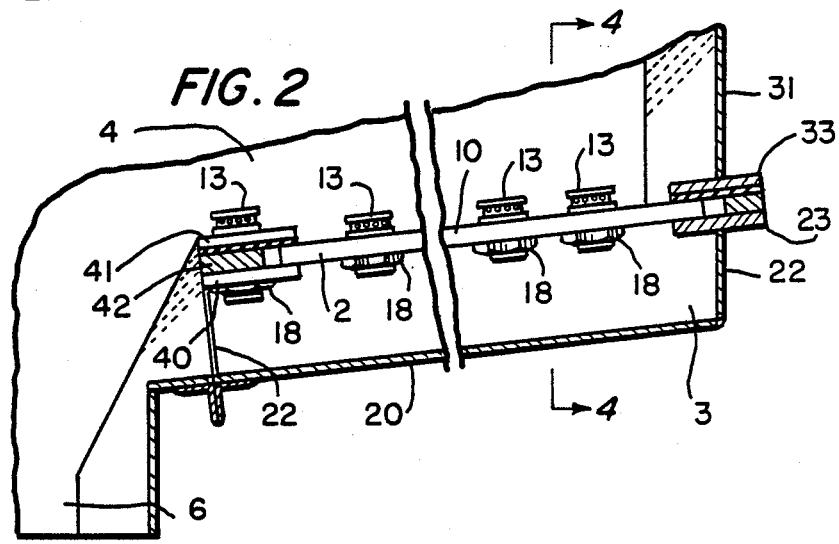
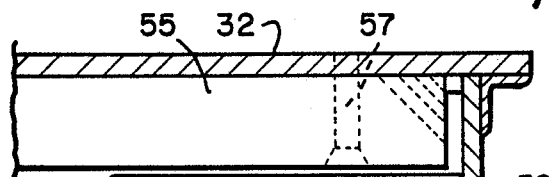
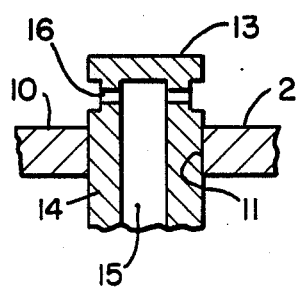
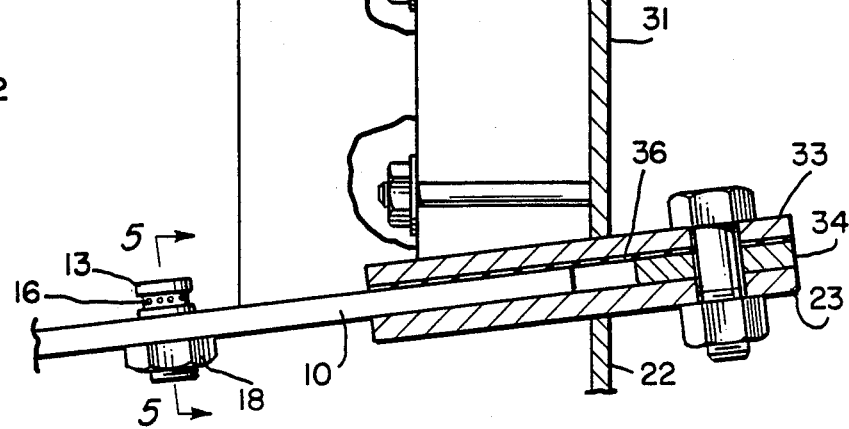

APPARATUS FOR CONVEYING HOT FINELY DIVIDED MATERIAL

BACKGROUND OF THE INVENTION

This invention relates to apparatus for conveying finely divided material of the fluidizing gravity conveyer type and is particularly designed for conveying high temperature material including material in excess of 500° F.

Prior to the present invention, it was known to utilize conveying apparatus for finely divided material such as alumina, cement raw meal, finish cement and the like, wherein a conveying conduit includes a gas permeable member dividing the conduit into an upper material chamber and a lower plenum chamber. The conduit includes an inlet at one end for supplying material to be conveyed to the material chamber and an outlet end for discharging material from the conduit. Gaseous fluid under pressure, such as air, is supplied to the lower plenum chamber for passage upwardly through the gas permeable member. Material supported on the gas permeable member in the material chamber is aerated and fluidized by the air under pressure. When fluidized, the material will flow downwardly from the inlet to the outlet by gravity. Usually, the conveying apparatus is set at a small slope such as 6° to facilitate material flow. Typical apparatus of this type are shown in U.S. Pat. No. 2,527,488.

Fluidizing gravity conveyers presently in use utilize tightly woven fabric with closely controlled air porosity as the gas permeable member. Prior to the present invention it was also known to utilize porous stones and sintered metals in place of the woven fabric for higher temperature applications. With a fabric gas permeable member. if high temperature materials are to be conveyed, the fabric will ignite and destroy the apparatus. The porous stones and sintered metals were capable of handling higher temperatures, but not the temperatures required for various applications such as in conveying very hot material.

It would be advantageous to be able to convey finely powered material at high temperatures such as temperatures on the order of 1000° to 1600° F. One such application would be in a preheater utilized in the cement manufacturing process. In such a process, high temperature gases exhausted from the rotary kiln utilized to produce the cement clinker are utilized to preheat raw material being supplied to the clinkering furnace. Typically, there preheaters consist of a plurality of serially connected cyclone separators with material being alternately entrained in the hot gases and separated by the cyclones to thereby preheat the material to as much as 1500° or 1600° F. A typical application is shown in U.S. Pat. application Ser. No. 883420 filed July 8, 1986 assigned to the assignee of the present application. Another application of fluidizing gravity conveyers in cement preheaters is shown in Japanese Patent Pre-Publication No. 58-156187, published Sept. 17, 1983.

SUMMARY

It is therefore the principal object of this invention to provide a apparatus for conveying finely divided dry material which is capable of use with high temperature materials without destruction of the conveying apparatus.

In general, the foregoing and other objects will be carried out by providing an apparatus for conveying finely divided dry material comprising a conduit having an inlet at one end for material to be conveyed and an outlet at its other end; a plate mounted in said conduit dividing the conduit into an upper material chamber and a lower plenum chamber for supporting material to be conveyed in the material chamber; said lower plenum chamber adapted to be connected to a source of gaseous fluid under pressure; said plate having a plurality of openings therethrough spaced along its length providing communication between the lower plenum chamber and the upper material chamber; a plurality of nozzles each mounted in one of said openings for dispersing gaseous fluid under pressure supplied to said lower plenum chamber through material supported by said plate to aerate material in the upper material chamber whereby the thus aerated material flows downwardly on said plate from said inlet to said outlet by gravity.

According to the present invention, the porous gas permeable member dividing the conduit into an upper material chamber and lower plenum chamber and for supporting the bed of material in the conduit has been replaced by a high temperature resistant material such as a substantially flat stainless steel plate with a plurality of openings therethrough along its entire length. A bubble cap or nozzle means is placed in each of these openings so that gaseous fluid under pressure supplied to the lower plenum chamber will pass through the openings and the bubble caps or nozzles to be disbursed throughout the material chamber. Material resting on the plate will be fluidized or aerated by the gas under pressure flowing through the nozzles. The nozzles are also made of a high temperature resistant material such as stainless steel or ceramic. The thus aerated or fluidized material will flow by gravity from the material inlet to the outlet in a manner known to those skilled in the art.

While it is known to utilize bubble caps on a heat resistant material plate as in fluid bed reactors, it is believed that the present invention is the first utilization of such an arrangement in a conveying apparatus suitable for conveying high temperature materials.

In order to permit the conduit to withstand the high temperatures and in order to maintain the temperature of the material being conveyed, the material chamber is lined with suitable refractory and insulating materials. Provision is made for thermal expansion of the plate within the conduit.

BRIEF DESCRIPTION OF THE DRAWING

The invention will be described in connection with the annexed drawing wherein:

FIG. 1 is a diagramatic view of a fluidizing gravity conveyer according to the present invention;

FIG. 2 is a enlarged view of a portion of the conveyer shown in FIG. 1;

FIG. 3 is a detail view of a portion of a conveyer according to the present invention;

FIG. 4 is a diagramatic view taken on the line 4—4 of FIG. 2 on a reduced scale showing a sectional view of the conveyer according to the present invention; and FIG. 5 is a view of a nozzle taken on the line 5—5 of FIG. 3.

DESCRIPTION OF THE PREFERRED IMBODIMENT

Referring to the drawing, the fluidizing gravity conveyer according to the present invention includes a conduit generally indicated at 1 for conveying hot, finely divided dry material such as preheated cement raw meal. The conveyer can also be utilized for conveying already calcined cement raw meal such as material discharged from a calcining furnace prior to being supplied to the clinkering furnace of a cement manufacturing apparatus.

As used herein, the term "hot material" will mean material in excess of 800° F. While the conveyor of the present invention is capable of conveying lower temperature material, the present invention is particularly intended for use in conveying hot material. The conduit 1 includes a gas permeable member 2 dividing the conduit into a lower plenum chamber 3 and an upper material chamber 4 and for supporting a bed of material within the material chamber 4. The conduit includes an inlet 5 at one end for suppluing material to the material chamber 4 and an outlet 6 at its other end for discharging material.

The lower plenum chamber 3 is adapted to be connected through line 7 to a source of gaseous fluid under pressure such as a blower (not shown).

The gas permeable member 2 is best shown in FIGS. 2 and 3 and includes a substantially flat plate 10 preferably made out of a high temperature material such as stainless steel or a ceramic material. The plate 10 will have a plurality of spaced apart openings 11 therethrough along its entire length. As shown in FIGS. 2 and 4, the openings 11 will be in both the width directions and in the length directions of the plate 10.

The gas permeable member also includes a plurality of nozzle means or bubble caps 13 each mounted in one of the openings 11. These nozzle means are generally known and may be of the type shown, for example, in U.S. Pat. No. 3,0404,438 or 3,040,439. The nozzles include a tubular member 14 having a vertical opening 15 flow connected with the plenum chamber 3 and a plurality of circumferentially spaced apart lateral openings 16 each flow connecting the central opening 15 with the material chamber 4 thereby flow connecting the plenum 3 with the material chamber 4. The lateral openings 16 are sufficiently large to permit gaseous fluid to flow therethrough without exceeding a desired pressure drop such as 0.5 psi across the nozzles and sufficiently small to substantially prevent the backflow of material from the material chamber to the plenum chamber when the air supply to the plenum chamber is shut off. If desired, the opening 16 can be sloped downwardly to sweep material away from the plate 10. This will also prevent material from back flushing through the opening 16 and 15 when the gas flow stops. The outside of the tubular bubble cap 13 is threaded and a nut 18 is used for securing the nozzle to the plate 10.

The conduit 1 includes a bottom 20, lower sidewalls 21 and lower endwalls 22 which together define the lower plenum chamber 3. The conduit 1 also includes upper sidewalls 30, upper endwalls 31 and a top 32 which define the upper material chamber 4. The endwall 22 has a flange 23 secured thereto and the endwall 31 has a flange 33 secured thereto. A spacer bar 34 and gasketing material 36 are positioned between the flanges so that the flanges 23 and 33 are spaced apart. The plate 10 fits between the spaced apart flanges as clearly shown in Figs. 2 and 3. As shown in the drawings, the plate 10 and flanges 23 and 33 are dimensioned to allow the plate 10 to expand relative to the conduit so that when high temperature material is being conveyed differential thermal expansion between plate 10 and the conduit walls will not affect the structure of the conveyor.

The plate 10 may be mounted to the sidewalls 21 and 30 by directly butting the plate 10 between flanges on the sidewalls with suitable gasketing to prevent leakage. The width of the conveyor is small, on the order of two feet or less, so that expansion of the plate in that direction is small, even with the high temperature encountered. Of course, if desired, the connection at the sidewall may be similar to that shown in FIG. 3 for the endwall connection.

The discharge end of the conveyor has the plate 10 secured between spaced apart plates 40 and 41 in a manner similar to the flanges 23 and 33. A space plate 42 and gasketing is also provided. However, in this case, in order to ensure a flow of material through the outlet 6, a nozzle means 13 has been placed through the plates 41 and 42 to supply fluidizing air at the outlet end 6 of the conveyer 1.

In order to handle the hot material, it is necessary to properly insulate the conveyor. For this purpose, a suitable dual composition arrangement is preferred with a layer of insulating refractory material indicated at 50 secured by fasteners 51 to the wall 30 and a second layer of refractory which may be cast in place indicated at 53. The roof of the conveyer may be insulated by material 55 secured to the top 32 by means of fasteners 57. This insulating refractory serves to maintain the temperature on the outside of the conveyer at less than 200° F. while conveying material having a temperature as high as 1600° F.

In operation, it is normal to supply ambient air to the plenum chamber 3 which ambient air will maintain the plenum chamber plate 10 and nozzles 13 relatively cool thereby allowing the use of stainless steel. This has the further advantage that a continuous supply of ambient air will allow the apparatus to be shut down to protect the parts when hot static material lays on top of the plate 10. The air under pressure flows upwardly through the passages in the nozzles 13 and the nozzles 13 disperse the gaseous fluid through the material supported by the plate 10 to aerate and fluidize the material in the material chamber 4. The thus aerated material will then flow downwardly on the plate from the upper material inlet 5 to the outlet 6 by gravity. When the gas flow through the nozzles stops, the material will tend to deaerate and settle back down on the plate 10.

It is normal to use ambient air supply to the plenum chamber 3. This cooler air will help protect the bottom of the plate 10 and the nozzle 13 to allow use of stainless steel even though the material temperatures may exceed that usual for stainless steel.

From the foregoing it should be apparent that the objects of the present invention have been carried out. It is intended that the foregoing be a description of a preferred embodiment and that the invention be limited solely by that which is within the scope of the appended claims.

I claim:

1. Apparatus for conveying finely divided dry material having a temperature in excess of 500° F. comprising a conduit having an inlet at one end for material to be conveyed and an outlet at its other end; a substantially flat plate mounted in said conduit dividing the conduit into an upper material chamber and a lower plenum chamber for supporting material to be conveyed in the material chamber, said lower plenum chamber adapted to be conected to a source of gaseous fluid under pressure; said plate having a plurality of openings therethrough spaced along its length and width providing communication between the lower plenum chamber and the upper material chamber; a plurality of nozzle means, each mounted in one of said openings for dispersing gaseous fluid under pressure supplied to said lower plenum chamber through material supported by said plate to aerate material in the upper material chamber whereby the thus aerated material will flow downwardly on said plate from said inlet to said outlet by gravity; each of said nozzle means having openings therein sufficiently large to permit gaseous fluid under pressure to pass therethrough at a desired pressure drop and sufficiently small to limit the backflow of material from the material chamber to the plenum chamber.

2. Apparatus for conveying material according to claim 1 wherein each of said nozzle means includes a cylindrical member having a central vertical opening flow connected with said plenum chamber and a plurality of circumferentially spaced apart lateral openings flow connecting said central opening with said material chamber; said lateral openings being sufficiently large to permit gaseous fluid to flow therethrough without exceeding a desired pressure drop across said nozzle means and sufficiently small to limit the backflow of material from said material chamber to said plenum chamber.

3. Apparatus for conveying finely divided dry material according to claim 2 wherein the upper material chamber is lined with heat resistant material.

4. Apparatus for conveying finely divided dry material according to claim 3 further comprising means for mounting said plate in said conduit for permitting thermal expansion of said plate relative to said conduit.

5. Apparatus for conveying finely divided dry material according to claim 4 wherein said conduit includes a bottom, lower sidewalls and lower end walls defining said lower plenum chamber, upper sidewalls, upper end walls and a top defining said material chamber; a pair of spaced apart flanges positioned between the upper endwalls and the lower endwalls and said plate is positioned between said flanges to define the means for permitting thermal expansion of said plate relative to said conduit.

6. Apparatus for conveying finely divided dry material according to claim 2 wherein the top of said nozzle is substantially flat.

7. Apparatus for conveying finely divided material having a temperature in excess of 500° F. comprising a conduit having an inlet at one end for material to be conveyed and an outlet at its other end; a substantially flat plate mounted in said conduit dividing the conduit into an upper material chamber and a lower plenum chamber for supporting material to be conveyed in the material chamber, said lower plenum chamber adapted to be connected to a source of gaseous fluid under pressure; said plate having a plurality of openings therethrough spaced along its length and width providing communication between the lower plenum chamber and the upper material chamber; a plurality of nozzle means, each mounted in one of said openings for dispersing gaseous fluid under pressure supplied to said lower plenum chamber through material supported by said plate to aerate material in the upper material chamber whereby the thus aerated material will flow downwardly on said plate from said inlet to said outlet by gravity; each of said nozzle means having openings therein sufficiently large to permit gaseous fluid under pressure to pass therethrough at a desired pressure drop and sufficiently small to limit the backflow of material from the material chamber to the plenum chamber; said conduit including a bottom, lower sidewalls and lower end walls defining said lower plenum chamber, upper sidewalls, upper end walls and a top defining said material chamber; a pair of spaced apart flanges positioned between the upper endwalls and the lower endwalls and said plate is positioned between said flanges to define means for permitting thermal expansion of said plate relative to said conduit.

8. Apparatus for conveying finely divided material according to claim 7 wherein each of said nozzle means includes a cylindrical member having a central vertical opening flow connected with said plenum chamber and a plurality of circumferentially spaced apart lateral openings flow connecting said central opening with said material chamber; said lateral openings being sufficiently large to permit gaseous fluid to flow therethrough without exceeding a desired pressure drop across said nozzle means and sufficiently small to limit the backflow of material from said material chamber to said plenum chamber.

9. Apparatus for conveying finely divided material according to claim 8 wherein the upper material chamber is lined with heat resistant material.

10. Apparatus for conveying material according to claim 7 wherein said nozzle means has a substantially flat top.

* * * * *